US006230660B1

(12) United States Patent
Greeson (10) Patent No.: US 6,230,660 B1
(45) Date of Patent: May 15, 2001

(54) APPARATUS FOR CONTROLLING INSECTS ON AN ANIMAL

(76) Inventor: John Stuart Greeson, 320 E. Cheyenne Rd., Dexter, NM (US) 88230

( * ) Notice: Subject to any disclaimer, the term of this patent is extended or adjusted under 35 U.S.C. 154(b) by 0 days.

(21) Appl. No.: 09/342,046

(22) Filed: Jun. 23, 1999

(51) Int. Cl.⁷ ................................................ A01K 13/00
(52) U.S. Cl. .......................... 119/665; 119/656; 119/658; 119/666; 119/667
(58) Field of Search .................... 119/665, 656, 119/658, 666, 667, 668, 669

(56) References Cited

U.S. PATENT DOCUMENTS

| 3,763,828 | * | 10/1973 | Tighe | 119/667 |
|---|---|---|---|---|
| 4,362,126 | * | 12/1982 | Ellerstorfer et al. | 119/69.5 |
| 4,567,856 | * | 2/1986 | Sorenson | 119/666 |
| 4,580,529 | * | 4/1986 | Wilson | 119/651 |
| 5,050,539 | * | 9/1991 | Liegner | 119/666 |
| 5,357,902 | * | 10/1994 | Norval et al. | 119/657 |
| 5,460,192 | * | 10/1995 | McClain | 132/333 |
| 5,630,379 | * | 5/1997 | Gerk et al. | 119/667 |
| 5,662,069 | * | 9/1997 | Smith | 119/665 |
| 5,911,196 | * | 6/1999 | Simmons et al. | 119/651 |
| 5,988,113 | * | 11/1999 | Zhioua et al. | 119/666 |
| 6,029,610 | * | 2/2000 | Ramsey et al. | 119/651 |

* cited by examiner

Primary Examiner—Charles T. Jordan
Assistant Examiner—Yvonne R. Abbott
(74) Attorney, Agent, or Firm—Ray R. Regan (57) ABSTRACT

Insects on an animal includes a reservoir for holding one or more ingredients including one or more chemicals. Also included is a delivery system for discharging the one or more ingredients on an animal. A water encapsulation member is mountable on the delivery system for applying water on an animal. A detection device that is selectively positionable on the delivery system is provided for detecting the location of an animal in relationship to the apparatus.

39 Claims, 6 Drawing Sheets

APPARATUS FOR CONTROLLING INSECTS ON AN ANIMAL

CROSS-REFERENCE TO RELATED APPLICATION

Not Applicable.

FEDERALLY SPONSORED RESEARCH AND DEVELOPMENT

Not Applicable.

FIELD OF THE INVENTION

The present invention pertains generally to insect control apparatus. More particularly, the present invention pertains to a substantially fully automated insect control apparatus for providing insect pest management. The present invention is particularly, but not exclusively, useful for controlling problems in connection with flies among cows in a dairy herd.

BACKGROUND OF THE INVENTION

Control and management of insects, including muscoid and nonmuscoid flies attracted to animals such as dairy cows, has proven challenging, costly, illusive, and frequently ineffective. Both muscoid and nonmuscoid flies, in a wide variety of species, cluster synanthropically to humans and their domestic animals, or in close proximity to humans and domesticated animals such as cows. Insects may have dramatic impact on the economics of animal production, which is a commercial industry constituting a significant contribution to the gross national product of the United States, where the dairy cattle industry has been estimated to produce $12 billion annually. The several different species of flies commonly found on livestock premises may cause a number of problems, including irritating cows so severely that milk production suffers; transmitting disease pathogens; increasing enteric (intestinal) diseases among humans associated with cow herds; violation of regulatory rules and regulations, and a host of similar problems.

A variety of devices, apparatus and methods have been proposed for controlling insects, including flies, among cattle, including dairy cows. None has proven effective in achieving the level of control demanded by industry operators. None of the devices, apparatus and methods proposed for controlling flies in and around a dairy herd provides substantially complete control of a fly population using a substantially automated insect control apparatus requiring minimal operator involvement during operation of the apparatus.

One proposal for controlling flies attracted to cattle, for example, is to bury fly parasites in soil beneath the surface of the soil on which cattle are penned. In addition, other insects, including nematodes, have been introduced into herd locations in hopes of fly control. Fly traps using bait attractants have been used. None of those techniques has proven effective in controlling fly populations attracted to cattle pens. For several reasons, parasites may achieve control of only a small portion of a fly population, and then only temporarily. Parasites reproduce more slowly than the rate at which flies reproduce. Parasite hatch rates are unreliable and unpredictable. A parasite population further may be reduced because parasites die or fly way. Parasite use as a method for attempting to control flies among cattle is labor intensive, therefore expensive, usually making the solution unacceptable to an operator of a cattle business. Virtually no fly control is achieved using nematodes. Nematodes are not suitable for use in acidic soils. Because of the large amounts of manure and urine produced by multiple pens of cattle, all soil used for cattle becomes acidic. In addition, use of nematodes is an impractical solution because nematodes must be applied or introduced into a herd at night, only after rain fall, and must be reintroduced frequently to achieve any measure of success in controlling insects on an animal and animal herd. Also, no marked reduction of a fly population occurs in connection with use of fly traps. Fly traps rely on bait, and no bait has proven effective, particularly for large tracts of land used to pen large cattle herds. Virtually no control has been achieved using scattered bait. "Scattered bait" generally is manufactured in the form of pellets comprised of sugar granules treated with poison and attractants. Studies show that flies develop a resistance or immunity to chemicals used in conventional bait.

Spraying or fogging chemicals on cattle has proven equally marginal in achieving control of flies for long periods of time. Spraying or fogging are very expensive procedures in view of using currently available apparatus and methods, particularly using effective chemicals, often because those apparatus and methods waste considerable amounts of costly chemicals during operation. Aerial spraying of insecticide on cattle has proven no more effective than use of fly parasites, nematodes, and fly traps using bait attractants. Other spraying techniques and apparatus include insecticide fogging of cattle by truck mounted sprayers, as well as larvicide spraying of manure. A variety of spray systems installed in wash pens have attempted to control flies among cattle, but none provides substantially complete control of a fly population using a substantially automated insect control apparatus that requires little operator involvement during operation the apparatus. Neither direct spraying nor aerial spraying of roosting flies at night, when flies tend to sleep, either by truck mounted or backpack sprayers, has produced other than marginal results. While providing a temporary reduction in a fly population, aerial spraying is extremely expensive, and must be repeated frequently to achieve any results. For the typical dairy herd operator, therefore, aerial spraying is not economically feasible. Further, appropriate chemicals cannot be used in connection with either aerial or truck mounted spraying devices because of unavoidable chemical contamination of feed and water. In addition, cattle often are frightened by airplane applications, resulting in cattle loss when cattle have been crushed against pen railings by other stampeding cows. Truck mounted fogging sprayers generally achieve only partial control of fly populations, and then only four a short period of time. Truck spraying also may constitute a health hazard to an operator of the sprayer unit. Further, when cattle pens are fogged, many flies avoid the effects of spraying by vacating the area being sprayed, but promptly return when fogging has ended.

Other forms of spraying apparatus propose use of more than one device for applying a spray to an animal, such as more than one nozzle, but use of multiple devices like multiple nozzles causes significant waste of chemicals, thus increasing significantly the cost of a spraying operation. Unique chemical compositions developed for animal herd application are very expensive. An oil based chemical mixture, therefore, is inherently expensive, yet an oil based chemical mixture has proven to be the only effective combination of ingredients to control flies among cattle, particularly in a dairy environment. In other currently available apparatus for spraying chemicals on an animal, the recommended positioning of any detector included in the apparatus causes the sprayers to become inoperative. When dairy cattle, for example, pass in the vicinity of sprayers, a detection device mounted anywhere other than generally above the head of a cow will become covered with significant quantities of manure, rendering the detection device inoperable. In addition, none of the existing sprayers provides for water encapsulation to encapsulate water with one or more ingredients to be applied to an animal, including one or more chemicals.

Other proposals for controlling insects among cattle include feeding cows oral larvicide and applying residual insecticides on the underside of shaders. No significant long-term reduction in the fly population has been observed using an oral larvicide, primarily because no chemical that might work effectively against flies may be fed orally to milking cattle. Even more primitive devices have been used, such as back rubbers, both manuals and automated. A manual back rubber applicator requires an operator to periodically remove, dip into a chemical, and reinstall a rubber device above the back of a cow that walks beneath the rubber device. No noticeable difference, however, in fly population has been observed using this method, and automated variations have proven no more effective. Ear tags, or other apparatus attachable to parts of an animal's body, containing a liquid chemical or insecticide dispensable on an animal, also have not satisfied the industry requirements for an apparatus that provides substantially complete control of the fly population in the form of a substantially automated system requiring relatively little attention during operation. Ear tags or similar apparatus connectable to parts of an animal body cannot be designed to release or apply sufficient chemicals either to an animal or to flies.

Other proposals for controlling flies among cattle herds include spraying underneath shaders, direct spraying of roosting flies, and spraying vegetation near cattle pens. Those techniques may eliminate problems associated with food and water contamination, but are labor intensive and expensive. An average dairy herd, for example, requires six to seven hours to complete one such spraying cycle, a cycle that must be repeated often to achieve even minimal control. A problem encountered by these methods is the tendency of flies to change roosting areas regularly, requiring an operator to hunt fly roosting areas to effectively induce a spray.

Larvicide spraying has not proven feasible because of the huge volume of water required to penetrate at least three inches below the surface of soil where fly larvae feed. The typical service truck carries only 500 gallons of water, and for a cattle herd held in a common arrangement of twelve pens, the cost of frequent larvicide applications is prohibitive.

Possibly in response to ecological concerns, sanitation techniques have been offered as possible solutions to fly problems. However, manure, because of its pasty consistency, is difficult to remove and separate from dirt in cattle pens. Proper sanitation efforts may reduce fly breeding in a given area, but will not achieve control. Harrowing, for example, must be done daily to achieve even thirty percent control, which is very labor intensive and expensive.

A problem to be solved, therefore, is to substantially reduce insect infestation, including flies of every specie, in and around animal herds, including herds of dairy cattle. What is needed, therefore, is an automated insect control apparatus that is useful for substantially fully controlling flies on and around an animal, including a bovine animal such as a cow, and for controlling the overall fly population on a farm.

One advantage of the novel automated insect control apparatus provided by the present invention is that the automated insect control apparatus provides substantially full control over flies, including the many known varieties of flies located among dairy cows. Also, because chemical application to an animal is isolated to a small area, environmental hazards are substantially reduced. The apparatus is so efficient that little chemical is wasted, thus affording the user a significant chemical cost reduction.

Yet another advantage of the present invention is use of a single spray nozzle to achieve effective application of one or more ingredients, including one or more chemicals, as well as an oil, to an animal. Because an oil based chemical mixture increases costs associated with spraying and applications if more than one nozzle is used to spray an animal with a combination of chemicals and oil, the use of a single nozzle is a significant advantage of the present invention.

Yet another advantage of the present invention is positioning the detection device included in the apparatus beyond reach of an animal as an animal moves in relationship to the apparatus. The capability of adjusting the location of the detection device above the passing head of an animal avoids contact by the animal with the detection device, and avoids a common problem around dairy herds where manure may be deposited on a detection device, rendering the detection capability of the device useless or inoperable.

Still another advantage of the present automated insect control apparatus is the water encapsulation unit mountable on the delivery system. The water encapsulation unit applies water to the animal passing the apparatus, and encapsulates the one or more ingredients, including one or more chemicals, discharged from the delivery system, to prevent waste and drift of the chemicals.

The present invention is an insect control apparatus that is substantially fully automated, an important advantage in an industry such as the dairy cattle industry, allowing frequent, regular, repetitive, effective and thorough application of the best and most appropriate combination of ingredients, including chemical mixtures, while substantially eliminating user involvement during operation of the apparatus.

Still another important advantage of the present invention is the ability to link an automated insect control apparatus, according to the present invention, with one or more other automated insect control apparatus, using the same electrical line or lines, controlled by the same timing device, and employing the same chemical distribution lines.

Another advantage of the present invention is use of a detector responsive to sound, such as an ultrasonic sensor, as well as use of an air operated diaphragm pump in combination with a solenoid to maintain system pressure at the point of delivery through a single nozzle, thus greatly increasing chemical delivery speed, and reducing costs due to excessive or inadequate sprays of chemical and oil.

Yet another advantage of the present invention is an automated insect control apparatus, and a method for operating an automated insect control apparatus, that respectively are easy to use and to practice, and which are cost effective for their intended purposes.

These advantages and other objects and features of such an apparatus for controlling insects on an animal, will become apparent to those skilled in the art when read in conjunction with the accompanying following description, drawing figures, and appended claims.

SUMMARY OF THE INVENTION

An apparatus for controlling insects on an animal, according to the present invention, includes a reservoir for holding one or more ingredients. The apparatus for controlling insects on an animal also includes a delivery system in fluid communication with the reservoir for discharging the one or more ingredients on the animal. The one or more ingredients dischargeable by the delivery system includes one or more chemicals. The one or more ingredients dischargeable by the delivery system also includes one or more oils. Also included in the present invention is a timing member for scheduling discharge of the one or more ingredients. As provided by the present invention, the apparatus for controlling insects on an animal also includes a pump. The pump of the present invention may be an air operated pump to contribute to holding the one or more ingredients in the delivery system at a substantially constant pressure before and during discharge of the one or more ingredients. The apparatus for controlling insects on an animal also includes one or more sources of electrical power for energizing operation of the apparatus. For the safety of an operator of the present invention, and to protect an animal in the vicinity of the apparatus, the present invention includes means for converting electrical energy from alternating to direct current, and delivering the electrical energy from a twenty-four volt source. In addition, the present invention includes a valve. The valve is responsive to the velocity of movement of the animal in relation to the apparatus. The valve may be a solenoid valve. The apparatus for controlling insects on an animal also includes a nozzle for discharging the one or more ingredients on the animal.

As provided by the present invention, an apparatus for controlling insects on an animal includes means for applying water to the animal. The means for applying water to the animal is mountable on the apparatus, preferably adjacent to the system for discharging the one or more ingredients. The means for applying water to an animal includes a water encapsulation unit. The water encapsulation unit is mountable adjacent to components of the delivery system. The water encapsulation unit also includes a second timing member. The second timing member may be used for scheduling operation of the water encapsulation unit simultaneously with or independently from the delivery system.

An apparatus for controlling insects on an animal also includes means positionable on the apparatus for detecting the presence of the animal in the vicinity of the apparatus. The means for detecting the presence of the animal in the vicinity of the apparatus may include a detection device. The detection device includes a sensor, including a sensor responsive to sound. In addition, the detection device also is energized by a twenty-four volt power supply. As indicated, the delivery system for discharging one or more ingredients includes a nozzle. The nozzle is for discharging the one or more ingredients. An apparatus for controlling insects on an animal further includes one or more hoses. The one or more hoses may connected to the delivery system and the water encapsulation system above the head of an animal moving past the apparatus.

The present invention also includes means connectable to the discharge regulating means, the water applying means, and the presence detecting means for selectively positioning the discharge regulating means, water applying means, and presence detecting means in relation to the animal. The selectively positioning means of the present invention may include a bracket. The bracket is mountable above the head of an animal. The selectively positioning means also includes an arm. The distal end of the arm of the present invention is mountable substantially perpendicular to the bracket. The sensor of the detection device is mountable on the proximal end of the arm for disposing the sensor above and either forward or aft of the head of the animal at commencement of discharge of the one or more ingredients. The first and second timing members of the present invention provide for substantially fully automated operation of the apparatus.

The foregoing has outlined broadly the more important features of the invention to better understand the detailed description which follows, and to better understand the contribution of the present invention to the art. Before explaining at least one embodiment of the invention in detail, it is to be understood that the invention is limited in application neither to the details of construction, nor to the arrangements of the components provided in the following description and drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Figure 1:
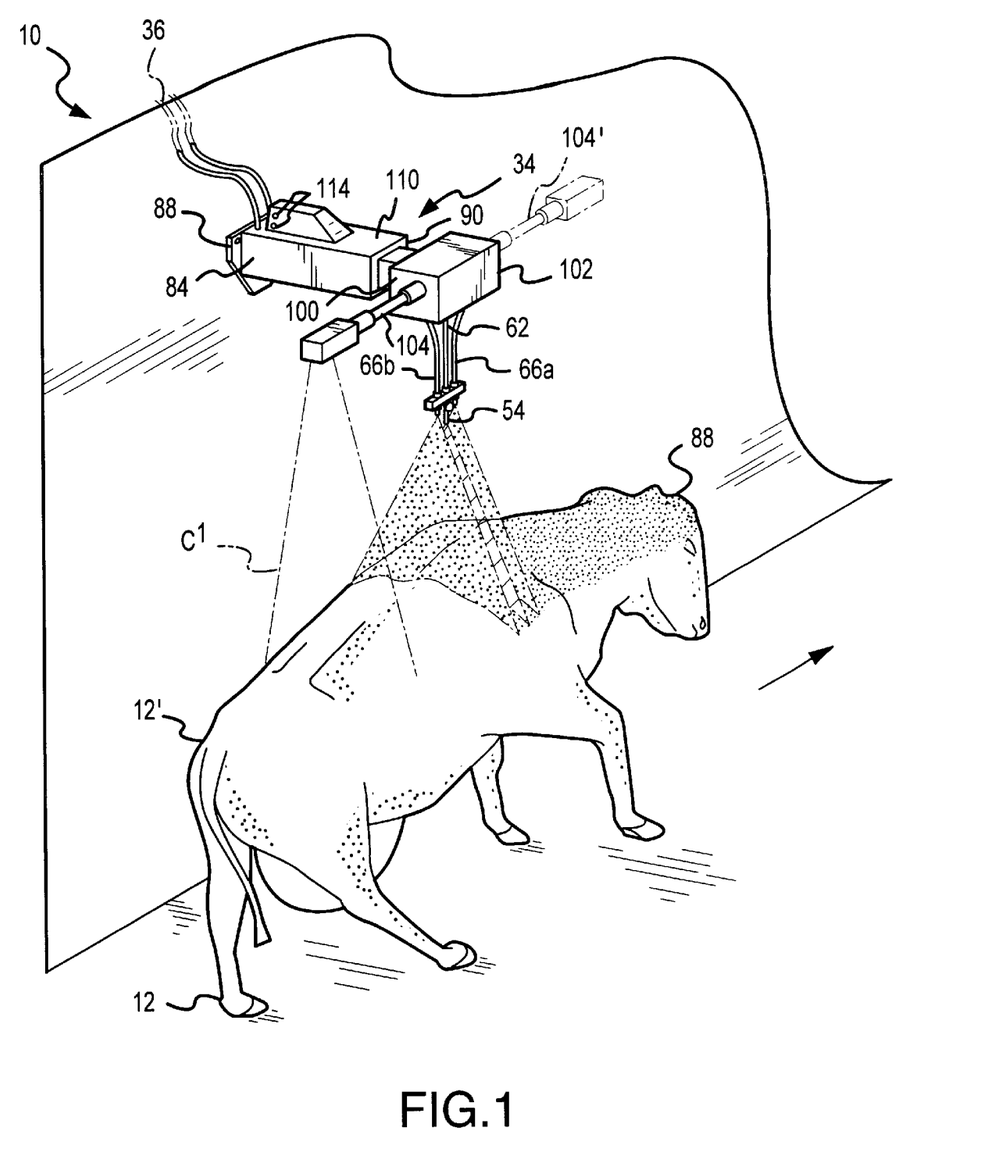
FIG. 1 is a perspective view of an apparatus for controlling insects on an animal, in an operative environment.
Figure 2:
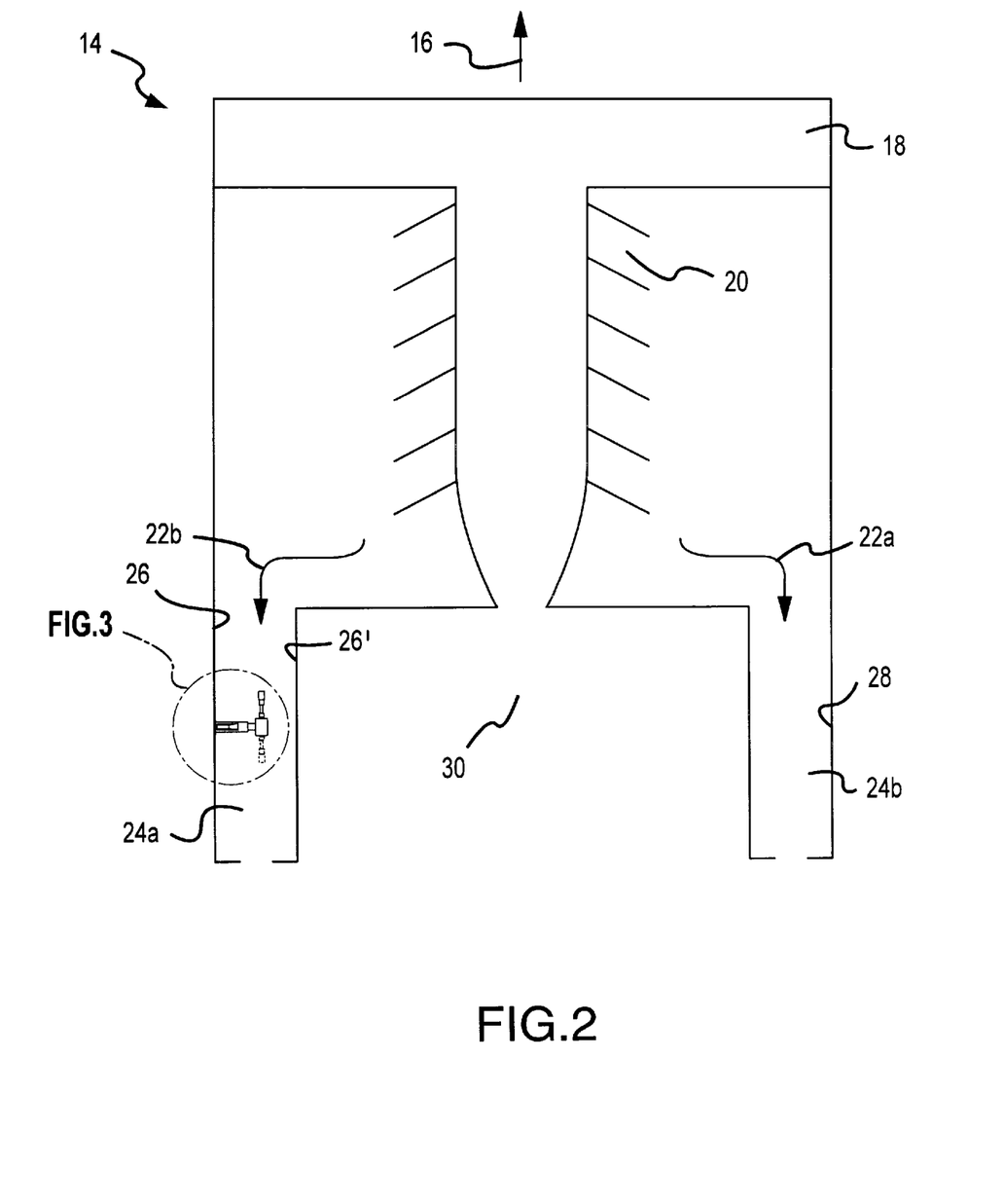
FIG. 2 is a top plan view of a representative floor plan of a dairy pen with an apparatus for controlling insects on an animal located on a wall of the pen.
Figure 3:
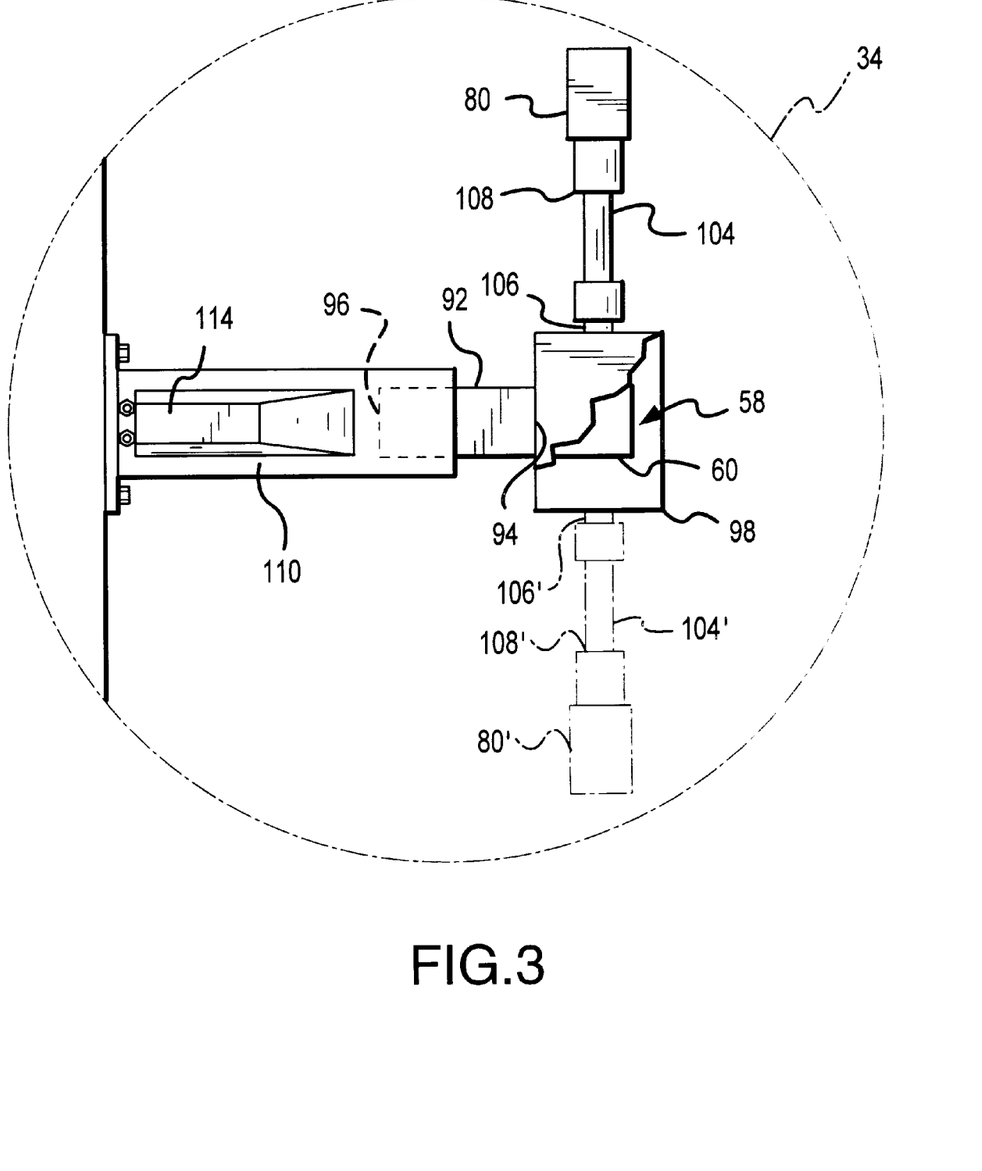
FIG. 3 is a top plan view of an apparatus for controlling insects on an animal as shown in FIG. 2.

Referring to FIG. 1, an apparatus for controlling insects on an animal 10, according to the present invention, is generally shown in an operative environment. An animal 12 is shown in FIG. 1 moving past and beneath the apparatus for controlling insects on an animal 10, in this case a cow 12'. FIG. 2 shows a representative, conventional, but not standard, floor plan of a dairy herd enclosure 14, and thus shows an additional top plan view of the operative environment for an apparatus for controlling insects on an animal 10. FIG. 2 thus includes a first arrow 16 indicating the direction toward outdoor pens (not shown) for one or more animals 12 adjacent enclosure 14. Also shown in FIG. 2 is a parlor area 18, an area where one or more animals 12 may be temporarily housed or held. As further shown in FIG. 2, representative enclosure 14 includes one or more milking stalls 20. After cow 12' is milked in a milking stall 20, cow 12' is directed out of enclosure 14 in the direction shown by curved arrows 22a,b through an exit alley 24a,b. As shown by cross-reference between FIGS. 1 and 2, an apparatus for controlling insects on an animal 10 is shown, in part, mounted on a first wall 26 inside enclosure 14 to enable cow 12' to pass beneath apparatus for controlling insects on an animal 10. As further shown in FIG. 2, apparatus for controlling insects on an animal 10 is also shown in FIG. 3. As will be apparent to one skilled in the art, apparatus for controlling insects on an animal 10 also may be mounted on the second inside wall 28 of enclosure 14, and one or more cows 12' could be directed through exit alley 24b. As also shown in FIG. 2, enclosure 14 may include a pre-milking pen 30 as a holding area for one or more cows 12'.

Figure 4:
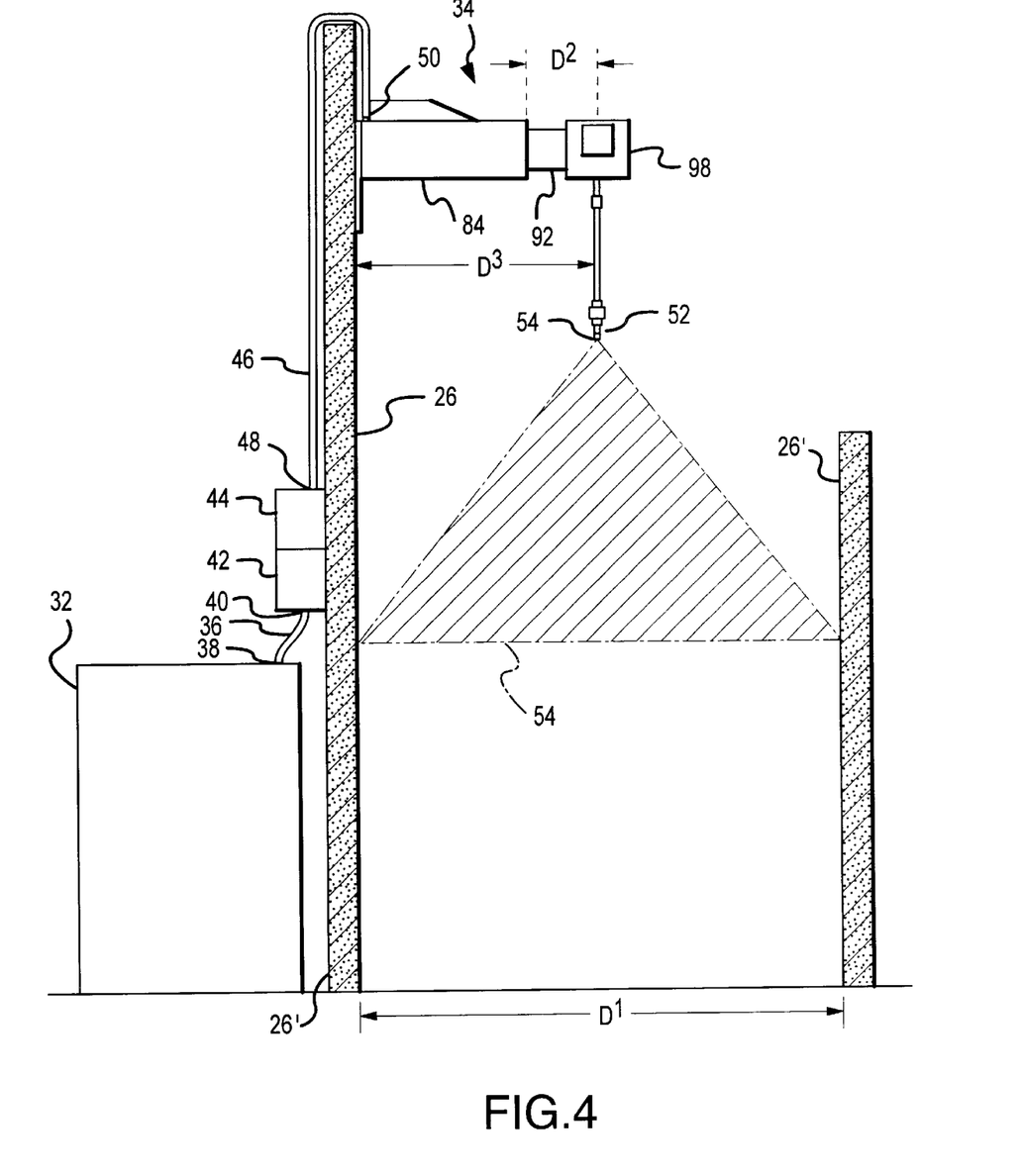
FIG. 4 is a front view of an apparatus for controlling insects on an animal showing a cross-sectional view of a wall on which an apparatus for controlling insects on an animal is mounted.

As shown by reference to FIG. 4, an apparatus for controlling insects on an animal 10 includes a reservoir 32. Reservoir 32 is provided for holding one or more ingredients (not shown). An apparatus for controlling insects on an animal 10 also includes a delivery system 34 shown generally by cross-reference among FIGS. 1 and 3 through 8. Delivery system 34 is in fluid communication with reservoir 32 to enable delivery system 34 to discharge the one or more ingredients in reservoir 32 on animal 12, including cow 12'. As best shown by cross-reference between FIGS. 1 and 4, in a preferred embodiment of the present invention, the components placing the one or more ingredients in reservoir 32 in fluid communication with delivery system 34 includes at least one short hose 36 having a lower 38 end and an upper end 40. Lower end 38 of short hose 36 is insertable into reservoir 32. Upper end 40 of short hose 36 is connectable to a first case 42. In a preferred embodiment of the present invention, as shown by reference to FIG. 4, first case 42 may be mounted on wall 26 outside of enclosure 14. First case 42 is provided for housing a pump (not shown). In a preferred embodiment of an apparatus for controlling insects on an animal 10, the pump housed in first case 42 is an air operated pump. The pump is included in the present invention to impart a pressure increase to the one or more ingredients to be discharged on animal 12. In a preferred embodiment of the present invention, the pump of the present invention is an air operated pump. The use of an air operated pump in the preferred embodiment of the present invention contributes to the apparatus for controlling insects on an animal 10 being capable of holding the one or more ingredients in delivery system 34 at a substantially constant pressure both before discharge of the one or more ingredients, and during discharge of the one or more ingredients on animal 12. An air operated pump is generally self-priming, its pressure may be regulated, and will start and stop substantially on demand. A nonexclusive example of an air operated pump of the present invention is provided by Flojet Corporation, model 5100.

As also shown in FIG. 4, in a preferred embodiment of the present invention the components placing the one or more ingredients in reservoir 32 in fluid communication with delivery system 34 includes at least one long hose 46 having a bottom end 48 and a top end 50. Bottom end 48 of long hose 46 is connectable to the pump located in first case 42. Upper end 50 of long hose 46 is connectable to an adjustable bracket (more filly described below) of delivery system 34. The one or more ingredients dischargeable by delivery system 34 includes one or more chemicals (not shown) containable in reservoir 32. A nonexclusive example of a chemical that may be included in reservoir 32 for discharge on animal 12 through delivery system 34, particularly in connection with controlling flies and other insects on a cow 12', is Permethrin-10 produced by Innotech, Inc. Another nonexclusive example of a chemical that may be included in the reservoir is Prentox® (PBO-8® from Prentiss Incorporated. The one or more ingredients dischargeable by delivery system 34 also includes one or more oils (not shown). A nonexclusive example of an oil that may be included in reservoir 32 for discharge on animal 12 through delivery system 34, particularly in connection with controlling flies and other insects on a cow 12', particularly in connection with controlling flies and other insects on cow 12', is Kaydol, a mixture of liquid hydrocarbons refined from petroleum, manufactured by Witco Corporation. A significant achievement of the present invention is the capability of the apparatus for controlling insects on an animal 10 to combine and use one or more concentrated chemicals, mixed with an oil as a base for holding the one or more chemical ingredients, and to discharge the combined one or more chemicals and one or more oils through a single dispenser 52 as shown by cross-reference among FIGS. 1, 4 and 5. In a preferred embodiment of the present invention, dispenser 52 is a nozzle 54. As also shown in FIG. 4, although a single dispenser 52 in the form of a single nozzle 54 is used, fill coverage of animal 12, including cow 12', of the ingredients contained in reservoir 32 is achieved. Full coverage of animal 12, including cow 12', of the ingredients contained in reservoir 32 is achieved also by locating first wall 26 and opposite wall 26' of exit alley 24a,b of enclosure 14 a distance $D^1$, as shown in FIG. 4, that approximates the cone 56 formed on discharge of the one or more ingredients from nozzle 54 on cow 12'. The present invention also reduces costs associated with discharging one or more chemicals through nozzle 54 because the present invention limits the amount of expensive chemical or chemicals that will be applied to cow 12'. Nozzle 54 of the present invention accelerates fluid from low speed to high speed at the point of discharge from nozzle 54, achieving the basic function of converting thermal energy into kinetic energy. In a preferred embodiment of the present invention, nozzle 54 is a flat fan nozzle. A flat fan nozzle will contribute to providing rapid spray response time. Preferably, nozzle 54 will discharge the one or more ingredients, including one or more chemicals, is a substantially flat 85 degree flat fan pattern in a range between 0.01 and 0.1 gpm, preferably about 0.06 gpm. In a preferred embodiment of the present invention, the diameter of the cone of discharged ingredients from the nozzle will be in a range from 30" to 44", preferably about 38", or distance $D^1$, which is the width of the representative exit alley 24a as shown in FIG. 2.

As shown perhaps best in FIG. 4, also included in the present invention is second case 44. Second case 44 houses a timing member (not shown). The timing member may be used for scheduling discharge of the one or more ingredients on animal 12. The timing member is electrically connected to reservoir 14 and delivery system 34.

An apparatus for controlling insects on an animal 10 also includes one or more sources of electrical power (not shown) for energizing operation of the apparatus for controlling insects on an animal 10. To enhance the safety of an operator of the present invention, and to protect an animal from electrical shock that might otherwise be occasioned on animal 12 when passing in the vicinity of apparatus 10, the present invention includes means for converting electrical energy from alternating to direct current, and delivering the electrical energy from a twenty-four volt source. In a preferred embodiment of the present invention, the converting means is a converter (not shown). The converter converts an alternating voltage of variable amplitude and frequency to a variable direct current voltage.

As best shown in FIG. 3, the present invention also includes a valve 58. Valve 58 is responsive to the velocity of movement of animal 12 in relation to apparatus 10. Valve 58 is included in the present invention to control flow and pressure in connection with the one or more ingredients to be discharged by delivery system 34 on animal 12. Preferably, valve 58 will maintain a pressure of approximately seven (7) pounds per square inch ("psi"). The preferred valve 58, therefore, permits discharge of the one or more ingredients, including one or more chemicals, more quickly than the check valves described below in detail that are used in connection with the one or more drop hoses included in the water encapsulation unit of the present invention. A variety of types of valves exist for use as valve 58, including without limitation control valves, isolation (block) valves, air release/vacuum breaking valves, and check valves. In the preferred embodiment of the present invention, valve 58 is a control valve known as a solenoid valve 60. Solenoid valve 60 of the present invention includes a current-carrying coil surrounding a metal iron coil, usually iron, and creates a magnetic field when current is passed through the coil. In a preferred embodiment of the present invention, solenoid valve 60 is a normally closed, two-way valve, that is opened when electrically energized. A nonexclusive example of a solenoid valve 60 in a preferred embodiment of the present invention is manufactured by GC Valves, Inc., model S301.

Figure 5:
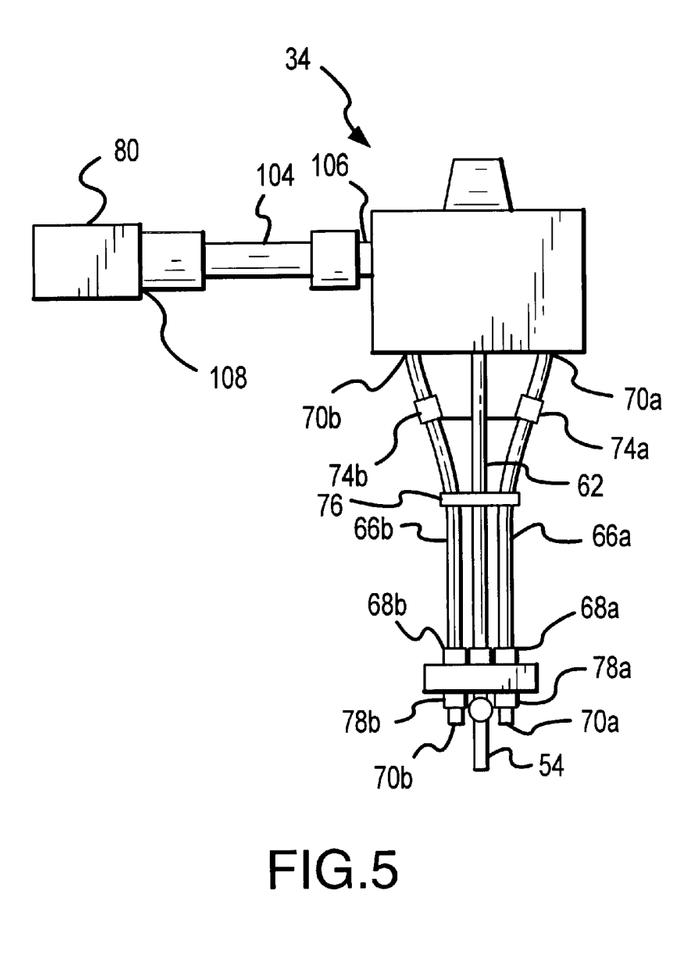
FIG. 5 is a side view of selected elements of an apparatus for controlling insects on an animal.
Figure 6:
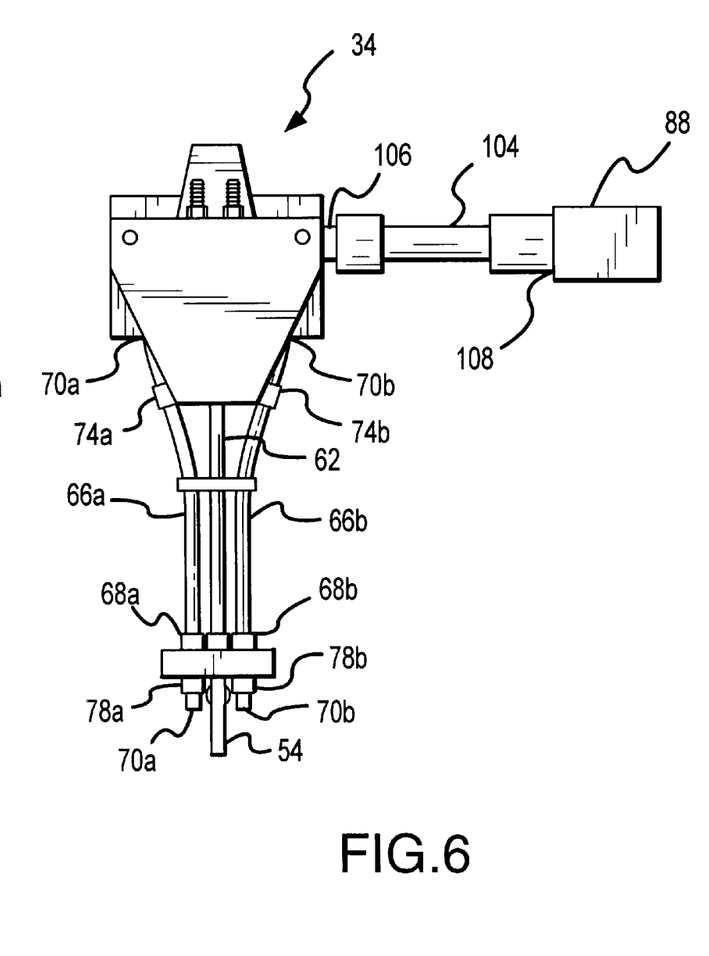
FIG. 6 is an alternative side view of selected elements of an apparatus for controlling insects on an animal.

As shown best in FIGS. 1, 5 and 6, delivery system 34 of a preferred embodiment of the present invention includes a first drop hose 62. In combination with solenoid valve 60, first drop hose 62 maintains substantially constant pressure on the one or more ingredients in delivery system 34, particularly between solenoid valve 60 and drop hose 62 connected to nozzle 54.

As provided by the present invention, an apparatus for controlling insects on an animal 10 also includes means for applying water to animal 12. The means for applying water to animal 12 is mountable on apparatus 10, preferably adjacent to first drop hose 62. In a preferred embodiment of the present invention, as shown by cross-reference among FIGS. 1, 5 and 6, the means for applying water to animal 12 includes a water encapsulation unit 64. Water encapsulation unit 64 is mountable adjacent to components of delivery system 34. As shown best by cross-reference between FIGS. 5 and 6, water encapsulation unit 64 includes one or more second drop hoses 66a,b having a leading end 68 and a following end 70. A water nozzle 72 is located adjacent leading end 68 of each second drop hose 66. Following end 70 of each second drop hose 66 includes a quick disconnect member 74, as shown in FIGS. 5 and 6. Each second drop hose 66 preferably is constructed of 0.25" stainless steel braided hoses to preclude animal 12 from breaking or chewing second drop hose 66. Drop hoses 66a,b may be held together by a hose bracket 76 as shown in FIGS. 5 and 6 to preclude an animal from inserting its head through or into the combination of first drop hose 62 and one or more second drop hoses 66a,b. In a preferred embodiment of the present invention, each second drop hose 66a,b is also equipped with check valve assembly 78 positioned adjacent the lower end of each drop hose, as shown in FIGS. 5 and 6, allowing rapid spray response when the apparatus for controlling insects on an animal 10 is energized. Each check valve assembly 78 is selected for inclusion in water encapsulation unit 64 for ability to discharge water in a substantially flat 85 degree fan pattern in a range of between 0.25 and 0.75 gallon of water per minute ("gpm"), preferably about 0.50 gpm. Water encapsulation unit 64 also includes a second timing member (not shown) located in second case 44. The second timing member may be used for scheduling operation of water encapsulation unit 64 simultaneously with or independently from delivery system 34.

Figure 7:
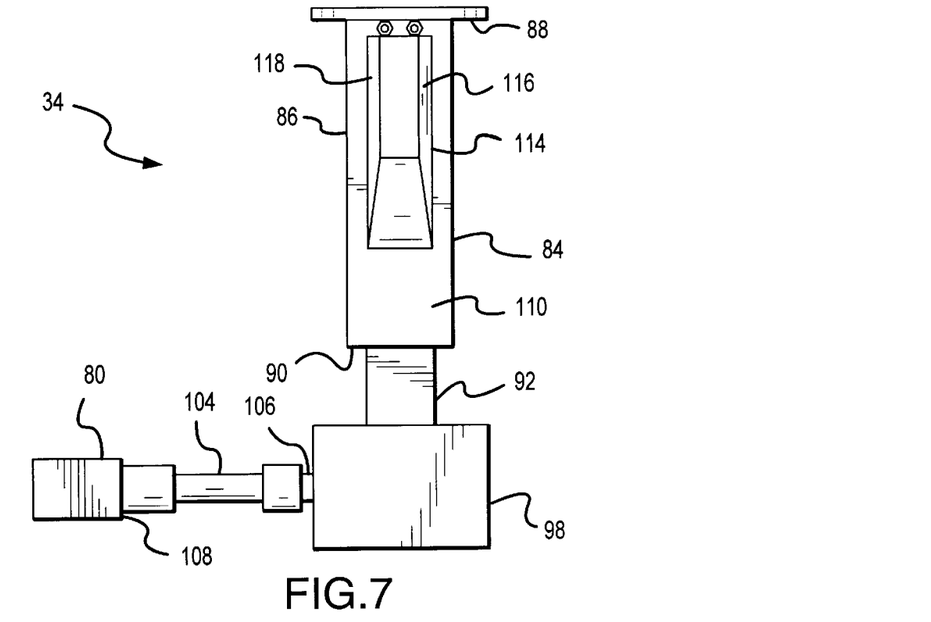
FIG. 7 is a top view of selected elements of an apparatus for controlling insects on an animal.
Figure 8:
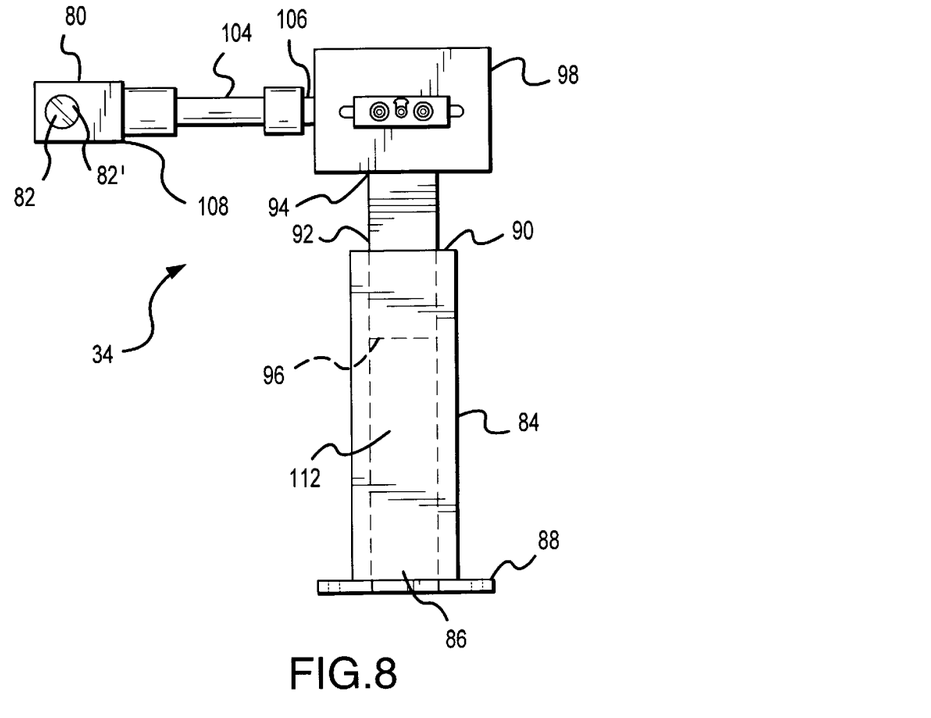
FIG. 8 is a bottom view of selected elements of an apparatus for controlling insects on an animal.

As shown by cross-reference between FIGS. 1, 3, and 5–8, an apparatus for controlling insects on an animal 10 also includes means positionable on apparatus 10 for detecting the presence of animal 12 in the vicinity of apparatus 10. The means for detecting the presence of animal 12 in the vicinity of apparatus 10 may include a detection device 80. In a preferred embodiment of the present invention, detection device 80 includes a sensor 82 as shown in FIG. 8. Sensor 82 may include a transducer, detector or gage. Preferably, sensor 82 selected for inclusion in the present invention provides a usable output in response to a specified measurand, and preferably is responsive to sound. Preferably, sensor 82 is a proximity ultrasonic sensor 82'. In addition, the preferred embodiment of ultrasonic sensor 82' has a sensing range of between 10 inches and 20 feet, preferably capable of providing a detection pattern in the shape of a sonic cone $C^1$ as shown diagrammatically in FIG. 1. The preferred diameter of the sonic cone ranges between 45 inches and 65 inches, preferably 56 inches. The sensing range of ultrasonic sensor 82' is preferably adjustable, and capable of withstanding significant physical abuse. The preferred ultrasonic sensor 82' also provides an output that includes electronic output signal. The electronic output signal causes the discharge to occur from nozzle 54 for discharging the one or more ingredients, and may cause the discharge to occur from a water nozzle 70a,b for discharging water from water encapsulation unit 64. A nonexclusive example of ultrasonic sensor 82' that may be used in connection with apparatus 10 is the Ultra-Beam 925 ultrasonic proximity sensor manufactured by Banner Engineering Corp. In a preferred embodiment of the apparatus for controlling insects on an animal 10, detection device is energized by a twenty-four volt power supply (not shown).

As shown by cross-reference among FIGS. 1 and 3, the present invention also includes means connectable to delivery system 34, water encapsulation unit 64, and detection device 80, for selectively positioning delivery system 34, water encapsulation unit 64, and detection device 80 in relation to the animal 12. In a preferred embodiment of the present invention, the selectively positioning means includes a bracket 84. Bracket 84 is formed with a hollow body 86 as shown best in FIG. 7. Hollow body 86 is formed with a chamber 88. Hoses and electrical wires and related devices (not shown) are directed from reservoir 32 through chamber 88 in hollow body 86 of bracket 84 to the other components of the present invention. As best shown by cross-reference among FIGS. 1 and 4, bracket 84 is mountable above the head 88 of animal 12. Bracket 84 is formed with a rear mounting plate 88 and a forward end 90. Bracket 84 includes a boom 92 formed with a first end 94 and a second end 96. Second end 96 of boom 92 is slidably engageable with chamber 86 formed in bracket 84, which contributes to selectively positioning delivery system 34, water encapsulation unit 64, and detection device 80 in relation to the animal 12. In a preferred embodiment of the present invention, boom 92 has a dimension between first end 94 and second end 96 in a range of 8 inches to 16 inches, preferably about 10 inches. Boom 92 also is slidably engageable with chamber 86 in bracket 84 to allow an operator of the present invention to adjust the distance $D^2$ as shown in FIG. 4 to cause valve 58 for discharging the one or more ingredients from nozzle 54 to respond within a range of 0.1 to 0.9 second, preferably 0.25 second, after detection of proximity of animal 12 by the sensor 82, preferably ultrasonic sensor 82', which in turn will allow the discharged ingredients to drop within a range of 3.0 feet to 4.0 feet, preferably 3.50 feet, to the approximate location of animal 12, specifically a cow 12', passing in proximity to the present invention.

As shown in FIGS. 3, 7 and 8, second end 96 of boom 92 is attachable to a housing pod 98. Housing pod 98 and boom 92, which, as indicated is slidably engageable with chamber 86 in bracket 84, also allow an operator of the present invention to adjust the distance D3, as shown in FIG. 4, for different widths of exit alley 24a,b as shown in FIG. 2. Housing pod 98 also is formed with an anterior surface 100 and a posterior surface 102. Bracket 84 of the present invention includes an arm 104 as shown in FIGS. 1, 3, and 5–8, to assist in selectively positioning apparatus 10. Arm 104 is formed with a distal end 106 and a proximal end 108. Distal end 106 of arm 104 of the present invention is mountable substantially perpendicular to bracket 84. Sensor 82 is mountable on proximal end 108 of arm 104 to dispose sensor 82, preferably an ultrasonic sensor 82', above head 88 of animal 12 at commencement of discharge of the one or more ingredients from the apparatus for controlling insects on an animal 10, as shown in FIG. 1. As will be apparent to one skilled in the art, arm 104 may be located either on anterior surface 100 or posterior surface 102 of housing pod 98, thus positioning sensor 82 either fore or aft housing pod 98 as animal 12 passes beneath housing pod 98. As also shown in FIG. 1, 3, 7 and 8, bracket 84 also is formed with a top plate 110 and a bottom plate 112. A container 114 is mounted on top plate 110 of bracket 84. Container 114 also is formed with a first side 116 and a second side 118, as best shown in FIG. 7. A variety of electrical components of the present invention may be housed within container 114. For example, interval and off relays, timing members, may be housed within container 114. In addition, indicator lights 116 may be mounted either on first side 116 or second side 118 of container 114. Indicator lights 116 advise an operator of the present invention if the present invention is operating properly and, if not, how to trouble-shoot the problems.

While the embodiment shown in the accompanying drawing figures is one embodiment of the present invention, it is merely one embodiment of the invention, is not intended to be exclusive, and is not a limitation of the present invention.

While the particular apparatus for controlling insects on an animal, as shown and disclosed in detail in this instrument, is fully capable of obtaining the objects and providing the advantages stated, this disclosure is merely illustrative of the presently preferred embodiments of the invention, and no limitations are intended in connection with the details of construction, design or composition other than as provided and described in the appended claims.

I claim:

1. An apparatus for controlling insects on an animal, comprising:
    a reservoir for holding one or more ingredients;
    means in fluid communication with the reservoir for regulating discharge of the one or more ingredients on the animal;
    means mountable adjacent to the discharge regulating means for applying water to the animal, wherein the discharge regulating means includes a single nozzle;
    ultrasonic means positionable on the apparatus for detecting the presence of the animal in the vicinity of the apparatus; and
    ultrasonic means connectable to the discharge regulating means, water applying means, and presence detecting means for selectively positioning the discharge regulating means, water applying means, and presence detecting means in relation to the animal.

2. An apparatus for controlling insects on an animal as recited in claim 1, wherein the one or more ingredients includes one or more chemicals.

3. An apparatus for controlling insects on an animal as recited in claim 1, wherein the one or more ingredients includes one or more oils.

4. An apparatus for controlling insects on an animal as recited in claim 1, wherein the discharge regulating means includes a timing member for scheduling application of the one or more ingredients on the animal.

5. An apparatus for controlling insects on an animal as recited in claim 1, wherein the discharge regulating means includes a pump for maintaining the one or more ingredients at a substantially constant pressure during operation of the apparatus.

6. An apparatus for controlling insects on an animal as recited in claim 5, wherein the pump is an air operated pump.

7. An apparatus for controlling insects on an animal as recited in claim 1, wherein the discharge regulating means includes a twenty-four volt power supply.

8. An apparatus for controlling insects on an animal as recited in claim 1, wherein the discharge regulating means includes means for activating and deactivating the apparatus.

9. An apparatus for controlling insects on an animal as recited in claim 1, wherein the discharge regulating means includes a solenoid valve responsive to movement of the animal in relationship to the apparatus.

10. An apparatus for controlling insects on an animal as recited in claim 1, wherein the water applying means includes one or more hoses.

11. An apparatus for controlling insects on an animal as recited in claim 1, wherein the selectively positioning means includes a bracket locatable above the head of the animal.

12. An apparatus for controlling insects on an animal as recited in claim 11, wherein the selectively positioning means includes an arm mountable substantially perpendicular to the bracket for disposing the presence detecting means above the head of the animal during operation of the apparatus.

13. An apparatus for controlling insects on an animal as recited in claim 12, wherein the arm mountable substantially perpendicular to the bracket is adapted for disposing the sensor forward of the bracket.

14. An apparatus for controlling insects on an animal as recited in claim 12, wherein the arm mountable substantially perpendicular to the bracket is adapted for disposing the sensor aft of the bracket.

15. An apparatus for controlling insects on an animal as recited in claim 14, wherein the selectively positioning means includes positioning the water applying means and the discharge regulating means on the bracket.

16. An apparatus for controlling insects on an animal as recited in claim 15, wherein the one or more ingredients is one or more chemicals.

17. An apparatus for controlling insects on an animal as recited in claim 16, wherein the delivery system includes an air operated pump.

18. An apparatus for controlling insects on an animal as recited in claim 17, further comprising means for converting electrical energy from alternating to direct current.

19. An apparatus for controlling insects on an animal as recited in claim 14, wherein the delivery system includes a reservoir for holding the one or more ingredients.

20. An apparatus for controlling insects on an animal as recited in claim 19, wherein the delivery system includes a timing member for scheduling discharge of the one or more ingredients.

21. An apparatus for controlling insects on an animal as recited in claim 20, wherein the apparatus includes one or more sources of electrical power for energizing operation of the apparatus.

22. An apparatus for controlling insects on an animal as recited in claim 20, wherein the timing member provides for substantially fully automated operation of the apparatus.

23. An apparatus for controlling insects on an animal, comprising:
a delivery system for discharging one or more ingredients on the animal, wherein the discharging means includes a single nozzle;
a water encapsulation member mountable on the delivery system for applying water on the animal; and
an ultrasonic detection device selectively positionable on the delivery system for detecting the location of the animal in relation to the apparatus.

24. An apparatus for controlling insects on an animal as recited in claim 23, wherein the one or more ingredients includes an oil.

25. An apparatus for controlling insects on an animal as recited in claim 24, wherein the one or more ingredients are held in the delivery system at a substantially constant pressure during discharge of the one or more ingredients.

26. An apparatus for controlling insects on an animal as recited in claim 25, wherein the delivery system includes a valve responsive to the velocity of movement of the animal in relation to the apparatus.

27. An apparatus for controlling insects on an animal as recited in claim 26, wherein the valve is a solenoid valve.

28. An apparatus for controlling insects on an animal as recited in claim 27, wherein the detection device includes a sensor.

29. An apparatus for controlling insects on an animal as recited in claim 28, wherein the sensor is responsive to sound.

30. An apparatus for controlling insects on an animal as recited in claim 28, wherein the detection device includes a bracket electronically connectable to but not structurally integral with other components of the apparatus.

31. An apparatus for controlling insects on an animal as recited in claim 30, wherein the detection device includes an arm mountable substantially perpendicular to the bracket for disposing the sensor above the head of the animal at commencement of discharge of the one or more ingredients.

32. An apparatus for controlling insects on an animal as recited in claim 26, wherein the water encapsulation unit includes a second timing member for scheduling operation of the water encapsulation unit independently from the delivery system.

33. An apparatus for controlling insects on an animal as recited in claim 32, wherein the detection device is energized by a twenty-four volt direct current power supply.

34. A method for operating an apparatus for controlling insects on an animal, comprising the steps of:
providing a reservoir for holding one or more ingredients;
placing a delivery system in fluid communication with the reservoir for discharging the one or more ingredients on the animal, wherein the delivery system includes a single nozzle;
installing a water encapsulation unit adjacent to the delivery system for applying water to the animal;
including an ultrasonic detection device for detecting the location of the animal in relationship to the apparatus; and
positioning selected components of the delivery system, water encapsulation unit, and detection device above the head of the animal during operation of the apparatus.

35. A method for operating an apparatus for controlling insects on an animal as recited in claim 34, wherein the reservoir providing step includes the substeps of:
a. providing a reservoir for holding one or more chemicals; and
b. providing a reservoir for holding one or more oils.

36. A method for operating an apparatus for controlling insects on an animal as provided in claim 34, wherein the delivery system placing step includes the substeps of:
a. including a timing member for scheduling discharge of the one or more ingredients on the animal;
b. including an air operated pump for holding the one or more ingredients at a substantially constant pressure during discharge of the one or more ingredients;
c. including an electrical current converter for converting alternating current to direct current for energizing the delivery system, water encapsulation system, and detection device;
d. including one or more switches for activating and deactivating the apparatus; and
e. including a valve responsive to a time interval during which the one or more ingredients may be applied to an animal and to the speed at which the animal moves in relationship to the apparatus.

37. A method for operating an apparatus for controlling insects on an animal as recited in claim 34, wherein the water encapsulation unit installing step includes the substep of providing a timing member for allowing operation of the water encapsulation unit independently of the delivery system.

38. A method for operating an apparatus for controlling insects on an animal as recited in claim 34, wherein the detection device including step includes the substep of
providing a source of electrical power from a twenty-four volt direct current power supply for energizing the detection device.

39. A method for operating an apparatus for controlling insects on an animal as recited in claim 34, wherein the selective components positioning step includes the substeps of:
a. positioning a separate bracket above the head of the animal during operation of the apparatus; and
b. mounting an arm substantially perpendicular to the bracket for disposing the sensor above the head of the animal during operation of the apparatus.

* * * * *